United States Patent [19]

Kanda

[11] Patent Number: 4,977,409
[45] Date of Patent: Dec. 11, 1990

[54] RECORDER WITH AUTOMATIC SCALE RECORDING DEVICE

[75] Inventor: Yasuyuki Kanda, Tokyo, Japan

[73] Assignee: Kabushiki Kaisha Toshiba, Kanagawa, Japan

[21] Appl. No.: 308,069

[22] Filed: Feb. 9, 1989

[30] Foreign Application Priority Data

Feb. 10, 1988 [JP] Japan .................................. 63-29264

[51] Int. Cl.[5] .............................................. G01D 9/00
[52] U.S. Cl. .................................. 346/23; 346/139 R
[58] Field of Search ................ 346/23, 139 R, 76 PH; 400/120

[56] References Cited

U.S. PATENT DOCUMENTS 3,922,686  11/1975  France et al. ........................ 346/23
4,346,390  8/1982   Allen et al. ........................... 346/76
4,359,745  11/1982  Reid ...................................... 346/23

*Primary Examiner*—Mark J. Reinhardt
*Attorney, Agent, or Firm*—Finnegan, Henderson, Farabow, Garrett and Dunner

[57] ABSTRACT

A recorder for recording analog data on recording paper moving in a fixed direction includes a recording unit for recording the analog data on the recording paper, a setting unit for setting scale maximum value and scale minimum value of graduation lines recorded on the recording paper, a main control unit for calculating the recording position of the graduation lines determined by the scale maximum value and scale minimum value and controlling the recording means, the setting means, and a graduation line recording unit for recording on the recording paper the graduation lines based on the graduation line position calculated by the main control unit.

6 Claims, 2 Drawing Sheets

......... SMALL DIVISION LINE
· · · · · MEDIUM DIVISION LINE
·   ·   · LARGE DIVISION LINE

RECORDER WITH AUTOMATIC SCALE RECORDING DEVICE

BACKGROUND OF THE INVENTION

This invention is directed generally to a recorder for printing various types of signals as analog data on recording paper, and is directed more particularly to a recorder having a scale recording device.

Conventional recorders print various types of analog voltage signals as waveforms on recording paper having graduation lines preprinted on it. Such recording paper, however is generally limited to patterns of graduation lines with the same scale, the same minimum value (such as 0%), and the same maximum value (such as 100%). Consequently, if one needs to use several different graduation line patterns with such conventional recorders, one needs to use several different types of recording paper. In addition when one changes the minimum or maximum of the scale with conventional recorders, one must also change the recording paper to obtain the desired pattern of graduation lines.

In recent years, various developers have proposed recorders equipped with elements such as thermal heads to record graduation lines, including both vertical and horizontal axes, on recording paper. Using such conventional recorders, a user selects one of several stored graduation lines patterns to be printed automatically on blank white recording paper.

The conventional recorders that automatically print stored graduation lines, however, are generally limited to a fixed number of graduation patterns. In addition, altering the scale minima or maxima requires selecting a new pattern of graduation lines, which complicates the operation of such recorders.

Thus, conventional recorders are not only unable to print suitable graduation lines for all the scale minimum and maximum values, they are also limited in the ease of altering the scale minimum and maximum.

SUMMARY OF THE INVENTION

It is an object of this invention to record analog data output while recording suitable graduation lines on recording paper.

Another object of the invention is to enable the recording of analog data on recording paper while automatically recording suitable graduation lines for various combinations of scale maximum and minimum values.

The foregoing objects are achieved according to the present invention by providing a recorder for recording analog input data and scale patterns onto recording paper. The recorder comprises waveform processing means for receiving and buffering the analog data, input means for receiving a scale maximum value and a scale minimum value representing, respectively the largest and smallest values of the analog input data to be recorded on the paper, main control means, coupled to the input means and to the waveform processing means, for automatically calculating positions of graduation lines on the paper according to the scale maximum value and scale minimum value, and recording means, coupled to the main control means for recording onto the paper, a waveform corresponding to the analog input data and graduation lines at the positions calculated by the main control means.

The accompanying drawings, which are incorporated in and constitute a part of this specification, illustrate a preferred embodiment of the invention, and together with the description, serve to explain the principles of the invention.

BRIEF DESCRIPTION OF THE DRAWINGS

A more complete appreciation of the present invention and many of its attendant advantages will be readily obtained by reference to the following detailed description considered in connection with the accompanying drawings, in which.

DESCRIPTION OF THE PREFERRED EMBODIMENTS

An embodiment of the invention is described below with reference to the drawings.

Figure 1:
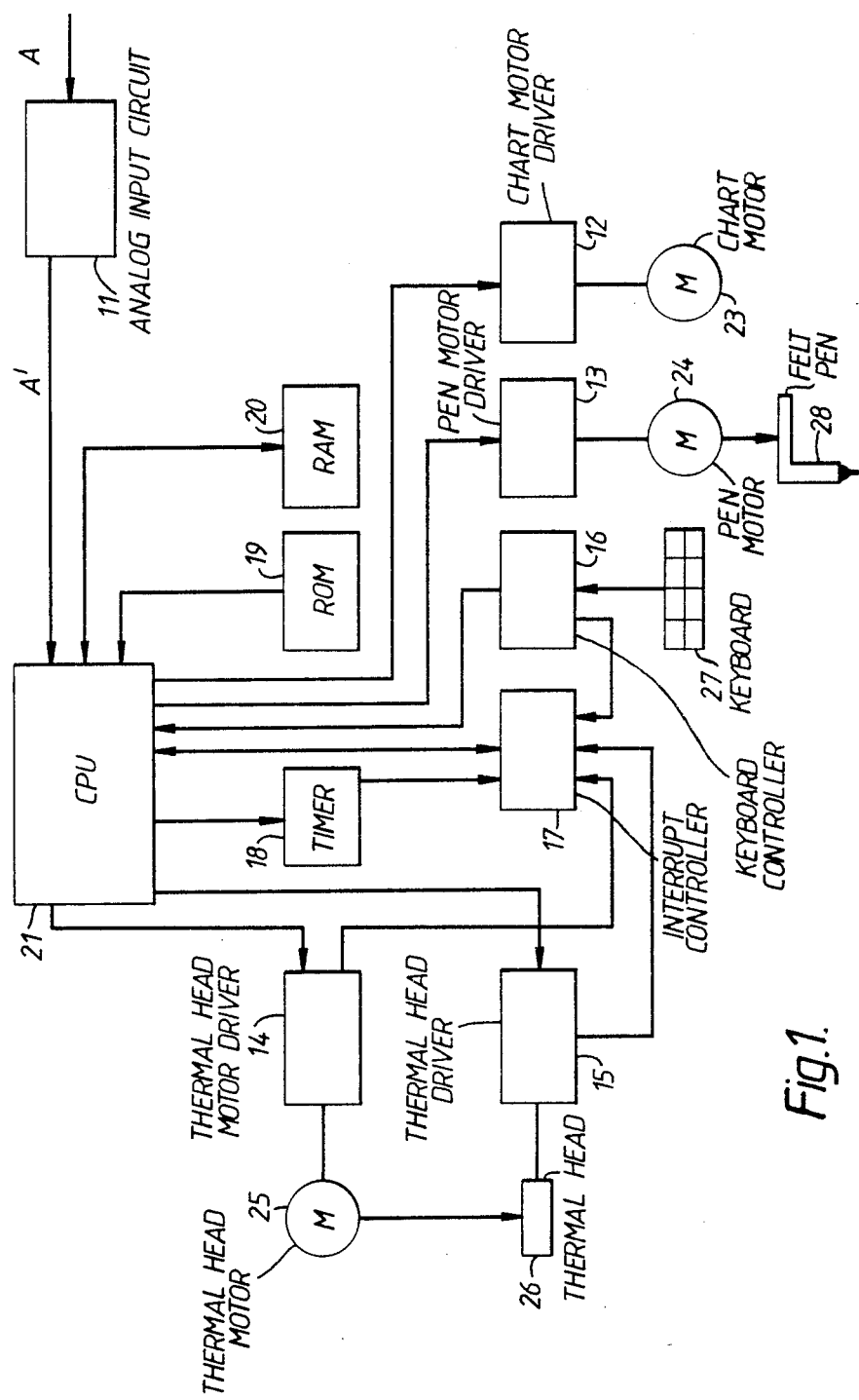
FIG. 1 is a diagram showing a preferred embodiment of a recorder according to this invention.

FIG. 1 is a hardware diagram showing an embodiment of a recorder 1 according to this invention. In FIG. 1, an analog signal A to be recorded is received by an analog input circuit 11, which preferably consists of an amplifier and an analog/digital converter (A/D converter) (not shown). Input circuit 11 converts analog signal A into a digital signal A'. Recorder 1 also includes chart motor driver 12, a pen motor driver 13, a thermal head motor driver 14, a thermal head driver 15, a keyboard controller 16, an interrupt controller 17, a timer 18, a ROM (read only memory) 19, and a RAM (random access memory) 20, which are all connected to a CPU (central processing unit) 21 through a plurality of lines.

Keyboard 27 is connected to keyboard controller 16. A chart motor 23 is connected to chart motor driver 12; a pen motor 24 is connected to pen motor driver 13; a thermal head motor 25 is connected to thermal head motor driver 14; and a thermal print head (hereinafter referred to as a "thermal head") 26 is connected to thermal head driver 15. Thermal head 26 acts as a scale recording element, and a felt pen 28 is used as a data recording element to record signal A' as an analog waveform.

Chart motor driver 12, pen motor driver 13, thermal head motor driver 14, and thermal head driver 15 are operated by commands from CPU 21. Chart motor driver 12 causes chart motor 23 to move heat sensitive paper (not shown) at a speed determined by chart speed data received as part of commands from CPU 21. Pen motor driver 13 effects a stepwise rotational drive of pen motor 24 in response to a command indicating the number of steps and the step rotation direction of pen motor 24. Thermal head motor driver 14 also drives thermal head motor 25 in a stepwise rotational fashion in response to commands from CPU 21.

Thermal head driver 15 receives drive data for thermal head 26 and causes head 26 to plot graduation lines on the recording paper by energizing the heat generating elements which form the principal constituents of thermal head 26.

Keyboard 27 is used by an operator to set scale minimum and maximum values across the width of the recording paper. Thermal head motor driver 14, thermal head driver 15, keyboard controller 16, and timer 18 form interrupt signals to interrupt controller 17.

Figure 2:
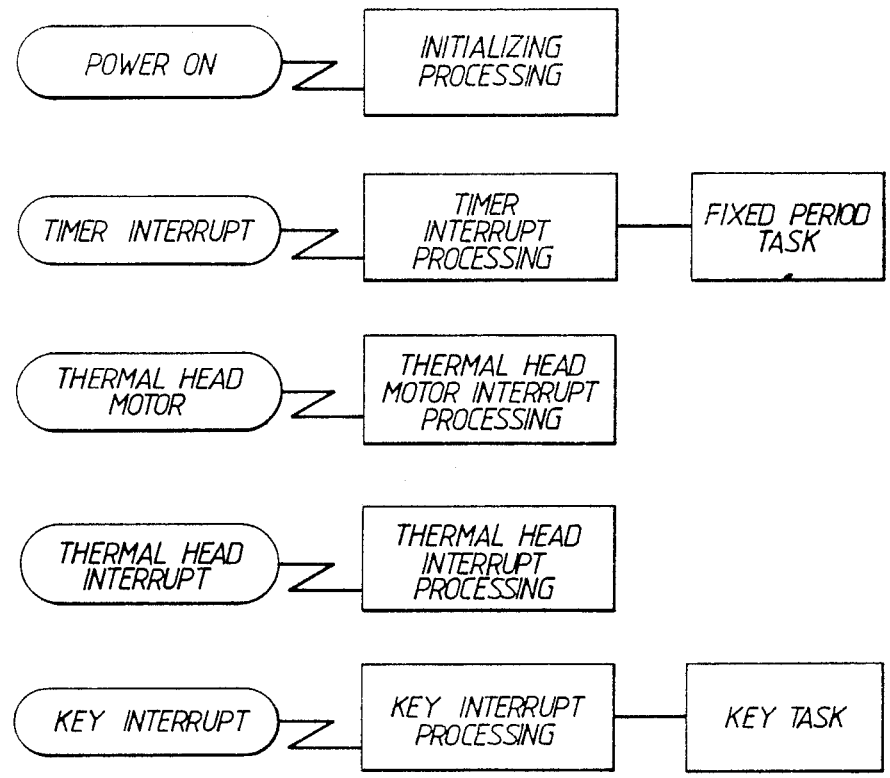
FIG. 2 is a diagram showing various functions performed by CPU 21 in the recorder shown in FIG. 1.

CPU 21 has various functions, several which are shown in FIG. 2. Those functions include (a) initializing processing upon power on of recorder 1; (b) timer interrupt processing that initiates a fixed period task to be carried out during an interrupt of fixed period from timer 18; (c) thermal head motor interrupt processing that operates in response to an interrupt generated when thermal head motor 25 is stopped; (d) thermal head interrupt processing that operates in response to an interrupt generated when printing is completed by thermal head 26; and (e) key interrupt processing that starts a key interpretation task in response to an interrupt generated by depression of a key in keyboard 27. ROM 10 stores programs used by CPU 21 to effect the functions (a) to (e), and RAM 11 stores various data used during the course of the process and the also stores processing results.

The usual operation of recorder 1 is as follows. When recorder 1 is powered up, CPU 21 initializes processing according to function (a). Next, CPU 21 outputs a drive command to chart motor driver 12. That drive command includes chart speed data which indicates the speed at which chart motor 23 moves the recording paper.

Next, CPU 21 executes its timer interrupt processing function whenever timer 18 causes an interrupt, which is once each fixed period (for example 125 msec). During the timer interrupt processing, CPU 21 reads converted signal A′ from analog input circuit 11 and records signal A′ in RAM 20. When this recording operation has been completed, CPU 21 determines the numbered step value of analog signal A′ from a reference position, such as the left edge of the recording paper. CPU 21 makes this determination by storing the step number of pen motor 24 into RAM 20 at a location corresponding to the location in which data A′ is stored. Next, CPU 21 calculates and stores a value of the present pen position from the pen position data stored during the preceding recording operation, the direction of rotation of pen motor 24 also known from the preceding operation, and the number of steps of rotation of motor 24 during the preceding operation. Next, CPU 21 determines values for the number of steps and the rotational direction of pen motor 24 necessary to move it to the calculated pen position value. The pen motor values are then set in pen motor driver 13 which, by stepwise rotary driving of pen motor 24, causes felt pen 28 to record an analog waveform for signal A′ onto the recording paper.

Next, the scale recording operation is preferably performed using thermal head 26. First CPU 21 calculates the distance which the recording paper has been fed from the number of timer 18's interrupts and the speed of chart motor 23. CPU 21 then calculates the recording frequency of the graduation lines from this distance.

Next, CPU 21 supplies a drive command to thermal head motor driver 14 which causes thermal head motor 25 to shift thermal head 26 to a position to record a graduation line at right angles to the direction which the recording paper is fed. CPU 21 then supplies a drive signal to thermal head driver 15 which causes the heat generating elements of thermal head 26 to generate heat and record a graduation line on the heat sensitive recording paper.

Thermal head motor 25 is preferably a stepping motor which is capable of shifting the recording paper in 2000 steps from a 0% position to a 100% across the width of the paper. When the recording period of the graduation lines begins, thermal head 26 is in the 0% position of the recording paper. CPU 21 first commands thermal head driver 15 to cause thermal head 26 to record a scale dot in the 0% position of the recording paper. When the recording of this scale dot is completed, a thermal head interrupt is generated. In response to that interrupt, CPU 21 carries out its thermal head interrupt processing and directs thermal head motor driver 14 to shift thermal head 26 to the position of the next graduation line.

When this shift is completed, another thermal head motor interrupt is generated. By repeatedly executing the thermal head motor interrupt processing function, CPU 21 commands thermal head driver 15 to cause thermal head 26 to record repeated scale dots across the width of the recording paper from the 0% to the 100% position.

At that point, thermal head motor 25 returns to the 0% position for the next recording.

Figure 3:
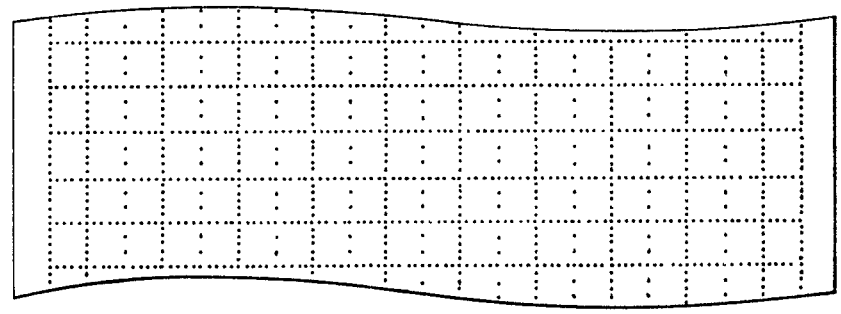
FIG. 3 is a depiction of recording paper on which graduation lines are recorded in accordance with this invention.

FIG. 3 shows an example of graduation lines recorded in accordance with this invention. As can be seen, there are three types of graduation lines: large division lines, medium division lines, and small division lines. CPU 21 calculates the pattern of graduation lines constituting the drive amount (step number) of thermal head motor 25 after receiving the scale minimum and maximum from keyboard 27 and executing by the key interrupt processing function. Calculation of the pattern of graduation lines preferably uses the scale maximum and minimum as follows:

The scale maximum (SH) and minimum (SL) values in the width direction of the recording paper are set as a decimal number with four integer digits and one decimal place. However, if the value is negative, the integer part has only three digits in order to accommodate a minus sign at the beginning of the integer portion.

First of all, the scale width (SHL), which is the difference of the scale maximum (SH) and minimum (SL), is found as follows:

$$SHL = SH - SL$$

Next, scale width (SHL) is divided into a mantissa $SHL_{FIX}$ and an index $SHL_{EXP}$.

$SHL_{FIX}$ is a number 100, more than 100 and less than 1000.

$$SHL = SHL_{FIX} * 10\ SHL_{EXP}$$

$$(100 \leq SHL_{FIX} < 1000)$$

Next, CPU uses the value of the mantissa $SHL_{FIX}$ of scale width SHL to calculate a mantissa $LW_{FIX}$ for the width of the large division lines, a mantissa $MW_{FIX}$ for the width of the medium division lines, and a mantissa $SW_{FIX}$ for the width of the small division lines as follows:

(where $100 \leq SHL_{FIX} < 110$)

$LW_{FIX} = 10$, $MW_{FIX} = 5$, $SW_{FIX} = 1$ (where $110 \leq SHL_{FIX} < 150$)

$LW_{FIX} = 20$, $MW_{FIX} = 10$, $SW_{FIX} = 2$ (where $150 \leq SHL_{FIX} < 210$)

$LW_{FIX} = 50$, $MW_{FIX} = 10$, $SW_{FIX} = 2$ (where $210 \leq SHL_{FIX} < 460$)

$LW_{FIX} = 50$, $MW_{FIX} = 10$, $SW_{FIX} = 5$ (where $460 \leq SHL_{FIX} < 1000$)

$LW_{FIX} = 100$, $MW_{FIX} = 50$, $SW_{FIX} = 10$.

Next CPU 21 uses the exponent $SHL_{EXP}$ of scale width SHL and the scale mimimum SL to determine the following relationship:

$$SL = SL_{FIX} * 10^{SHL_{EXP}},$$

where $SL_{FIX}$ is the mantissa

Next, the exponent ($LSL_{FIX}$ in the case of the large division lines, $MSL_{FIX}$ in the case of the medium division lines, and $SSL_{FIX}$ in the case of the small division lines) of the position which is closest to 0% of each division line is found as follows:

$$LSL_{FIX} = LW_{FIX} * [SL_{FIX}/LW_{FIX}]$$

$$MSL_{FIX} = MW_{FIX} * [SL_{FIX}/MW_{FIX}]$$

$$SSL_{FIX} = SW_{FIX} * [SL_{FIX}/SW_{FIX}],$$

where [A] is the integer obtained by raising the fractional part from A.

CPU 21 then calculates a value for $P_{SSL}$ which represents of the step number of the small division line (the 0% position is taken to be 0) of the thermal head motor 25 at the position closest to 0% as follows:

$$P_{SSL} = (SSL_{FIX} - SL_{FIX}) * 2000 / SHL_{FIX}$$

Next, the small division point positioned closest to 0% of the large/medium divisions is found (in the case of the large divisions, $LSL_N$, in the case of the medium divisions, $MSL_N$) as follows:

$$LSL_N = (LSL_{FIX} - SSL_{FIX}) / SW_{FIX}$$

$$MSL_N = (MSL_{FIX} - SSL_{FIX}) / SW_{FIX}$$

Next, the number of the small divisions represented by the large/medium division width is found (in the case of the large divisions, $LW_N$, in the case of the medium divisions, $MW_N$) as follows:

$$LW_N = LW_{FIX} / SW_{FIX}$$

$$MW_N = MW_{FIX} / SW_{FIX}$$

Next, the step number Sn of thermal head 26 in the position of the full graduation line pattern of the small division lines is found as follows:

$$Sn = (P_{SSL} + n * P_{SW})_I$$

where $n = 0, 1, 2, 3, \ldots$, and where $(A)_I$ is an integer obtained by rounding the decimal part of A after the calculation for A is accomplished via a floating point decimal calculation.

By adding 0 and 2000 to Sn (if they are already present, they are not added), the position determined of the full graduation line pattern of the small division lines can be determined. Next, the step number Mn of the thermal head 25 for the full graduation line pattern of the medium division lines is found as follows:

$$Mn = (P_{SSL} + MSL_N * P_{SW} + n \times MW_N * P_{SW})$$

where $n = 0, 1, 2, 3, \ldots$, Mn 2000.

From the above, the values obtained by adding 0 and 2000 to Mn (they are not added if they are already present) are taken as the positions of the full graduation line pattern of the medium division lines.

Next, the step number Ln of the thermal head 25 for the full graduation line pattern of the large division line is found as follows:

$$Ln = (P_{SSL} + LSL_N * P_{SW} + n * LW * P_{SW})_I$$

where $n = 0, 1, 2, 3, \ldots$, Ln 2000.

By adding 0 and 2000 to Ln (where they are already present, they are not added) the values obtained are taken as the positions of the full graduation line pattern of the large division lines.

By these calculations, CPU 21 calculates the graduation line pattern as follows: the positions of the large division lines occur every $1*10^n$ or $2*10^n$ or $5*10^n$ (where n is an integer); the positions of the medium division lines occur every $1*10^m$ or $5 \times 10^m$ (m is an integer); and the positions of the small division lines become every $1*10^l$ or $2*10^l$ or $5*10^l$ (l is an integer). The graduation lines, which are thus very easy to read, are recorded using the thermal head interrupt processing function of CPU 21 to drive thermal head motor 25 the proper amount of the step number of the differences of the pattern of each graduation line found as above.

FIG. 3 shows an example of recording a scale where the scale minimum value is set to $-0.5$, and the scale maximum value is set to 9.5. The positions of the large division lines are $-0.5, 0, 1, 2, 3, \ldots, 9.5$ from the left edge shown in the drawing, which produces a scale that is extremely easy to read.

As explained above with the preferred embodiment of this recorder, the prescribed calculations provide an easy-to-read graduation line pattern consisting of the various large, medium, and small graduation lines, i.e., drive amounts (step numbers) of thermal head motor 25. Based on the drive amounts, graduation lines can be recorded on the recording paper by thermal head 26.

Consequently, appropriate graduation lines can be simply and automatically recorded whatever the scale minimum or scale maximum value. Also, even if the scale minimum or scale maximum value is altered, a suitable fresh pattern of graduation lines can be immediately worked out corresponding to these values. For this reason, it is not necessary to provide an enormous number of different types of recording paper, as is conventionally necessary, so only one type of recording paper need be provided. Also, arbitrary values can be set for the scale minimum and scale maximum values without restriction from the graduation line pattern.

It should be noted that this invention is not restricted to the above described embodiment, but could be put into practice in alternate FORMS without departing from the scope of its essence.

(a) In the above embodiment, the case is described wherein the pattern of graduation lines is recorded entirely by dots. However, in order to make the positions of the large divisions stand out more, it is also possible to record the positions of the large divisions as vertical straight lines.

(b) In the above embodiment, it would be possible to record the positions of the large divisions by vertical straight lines having a width equal to three steps of the thermal head motor 25, to record the positions of the medium divisions by vertical straight lines having a width equal to two steps, and to record the positions of the small divisions by vertical straight lines having a width of one step.

(c) This invention is not restricted to a recorder provided with a single pen, but could be applied in the same way to recorders equipped with two or more pens.

(d) In the above embodiment, the waveform recording element is not restricted to a felt pen, but could be any recording means, such as an ink pen, ball pen, thermal head, wire dot head, ink jet head, etc.

(e) In the above embodiment, the scale recording element is not restricted to being a thermal head, but could be any recording means such as a wire dot head, an in-jet head, or a plotter pen.

It should be understood that the detailed description and specific examples of the preferred embodiments of the invention are given by way of illustration only, and various changes and modifications within the spirit and scope of the invention will become apparent to those skilled in the art from this detailed description.

What is claimed is:

1. A recorder for recording analog input data and scale patterns onto recording paper, said recorder comprising:
   waveform processing means for receiving and buffering the analog input data;
   input means for receiving a scale maximum value and a scale minimum value of graduation lines to be recorded on said paper;
   main control means, coupled to said input means and to said waveform processing means, for automatically calculating positions of graduation lines on said paper according to said scale maximum value and said scale minimum value;
   recording means, coupled to said main control means, for recording onto said paper a waveform corresponding to said analog input data and graduation lines at the positions calculated by the main control means.

2. The recorder of claim 1 wherein the recording means includes
   a pen;
   a pen motor, physically connected to said pen for driving the position of said pen; and
   a pen motor driver, coupled to said main control means and to said pen motor, for controlling the pen motor.

3. The recorder of claim 1 wherein said recording paper is heat sensitive paper, and wherein said recording means includes
   a thermal head;
   thermal head driver means, coupled to said main control means and to said thermal head, for causing the thermal head to apply heat to the heat sensitive paper and thereby record said graduation lines,
   a thermal head motor, physically connected to said thermal head, for controlling the position of said thermal head relative to said paper; and
   thermal head motor driver means, coupled to said main control means, for driving the thermal head motor means in response to commands from said main control means.

4. The recorder of claim 1 wherein said main control means includes
   a central processing unit, and
   a memory coupled to said central processing unit for storing data and command programs.

5. A method of recording onto recording paper a waveform corresponding to analog input data and graduation lines, the method comprising the steps of:
   receiving a scale maximum value and a scale minimum value for said waveform;
   automatically determining recording graduation line positions on said paper of graduation lines according to said scale maximum value and said scale minimum value; and
   recording onto the recording paper the waveform and the graduation lines at the determined graduation line position.

6. The method of claim 5 wherein said automatic determining step includes the steps of determining the positions and sizes of different ones of said graduation lines, and
   wherein said recording step includes the step of recording said different graduation lines onto said recording paper.

* * * * *